US010521181B2

(12) United States Patent
Menon et al.

(10) Patent No.: US 10,521,181 B2
(45) Date of Patent: Dec. 31, 2019

(54) REDUCING DISCOLORATION OF A DISPLAY STACK

(71) Applicant: Amazon Technologies, Inc., Reno, NV (US)

(72) Inventors: Anoop Menon, Capitola, CA (US); Robert Waverly Zehner, Los Gatos, CA (US); John-Paul Clement Perron, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1449 days.

(21) Appl. No.: 13/931,279

(22) Filed: Jun. 28, 2013

(65) Prior Publication Data

US 2015/0004382 A1 Jan. 1, 2015

(51) Int. Cl.
*G06F 3/00* (2006.01)
*G06F 3/147* (2006.01)

(52) U.S. Cl.
CPC ............ *G06F 3/147* (2013.01); *Y10T 156/10* (2015.01); *Y10T 156/1062* (2015.01); *Y10T 428/24942* (2015.01)

(58) Field of Classification Search
CPC .. G06F 3/00; G02F 1/13338; G02F 1/133502; G09G 3/00; B32B 7/00; B32B 37/00
See application file for complete search history.

(56) References Cited

U.S. PATENT DOCUMENTS

| 7,787,169 | B2 | 8/2010 | Abramson et al. | |
|---|---|---|---|---|
| 8,647,727 | B1* | 2/2014 | Barnidge | G02B 5/0242 156/60 |
| 2007/0206148 | A1 | 9/2007 | Hara et al. | |
| 2009/0038749 | A1* | 2/2009 | Kim | B32B 7/12 156/247 |
| 2010/0245370 | A1* | 9/2010 | Narayanan | G02B 5/208 345/522 |

(Continued)

FOREIGN PATENT DOCUMENTS

| CN | 102190972 | 9/2011 |
|---|---|---|
| CN | 202217253 | 5/2012 |

(Continued)

OTHER PUBLICATIONS

PCT Search Report and Written Opinion dated Nov. 14, 2014 for PCT Application No. PCT/US14/44634, 8 Pages.
The Extended European Search Report dated Feb. 24, 2017 for European patent application No. 14818185.2, 8 pages.

(Continued)

*Primary Examiner* — Maria V Ewald
*Assistant Examiner* — Daniel P Dillon
(74) *Attorney, Agent, or Firm* — Lee & Hayes, P.C.

(57) ABSTRACT

In some implementations, an electronic device includes a display stack to display content. The display stack can include a number of substrates coupled using a first optically clear adhesive (OCA) and a second OCA. In an implementation, the first OCA includes an acrylic-containing OCA and the second OCA includes a silicon-containing OCA. In some instances, the first OCA can include an additive to filter ultraviolet radiation. In a particular implementation, the first OCA can have a total luminous transmittance of no greater than approximately 30% for at least a portion of the UV spectrum radiation.

20 Claims, 3 Drawing Sheets

(56) References Cited

U.S. PATENT DOCUMENTS

| | | | |
|---|---|---|---|
| 2012/0140151 A1 | 6/2012 | Yoshimura et al. | |
| 2012/0229893 A1* | 9/2012 | Hebrink | G02B 1/04 359/359 |
| 2012/0287674 A1* | 11/2012 | Nichol | G02B 6/0018 362/611 |
| 2012/0325402 A1* | 12/2012 | Suwa | B32B 37/1207 156/275.5 |
| 2013/0128134 A1 | 5/2013 | Wu | |
| 2014/0062939 A1* | 3/2014 | Zehner | G06F 3/044 345/174 |

FOREIGN PATENT DOCUMENTS

| | | | | |
|---|---|---|---|---|
| WO | WO2010134362 | 11/2010 | | |
| WO | WO 2011112447 A2 * | 9/2011 | ......... | B32B 37/1207 |
| WO | WO-2011112447 A2 * | 9/2011 | ......... | B32B 37/1207 |
| WO | WO 2012002706 A2 * | 1/2012 | ............ | B32B 27/36 |
| WO | WO-2012002706 A2 * | 1/2012 | ............ | B32B 27/36 |
| WO | WO2012068543 | 5/2012 | | |
| WO | WO2012079159 | 6/2012 | | |
| WO | WO2014176209 | 10/2014 | | |

OTHER PUBLICATIONS

The Chinese Office Action dated Feb. 5, 2018 for Chinese Patent Application No. 201480036642.5, a counterpart foreign application of U.S. Appl. No. 13/931,279.

The Chinese Office Action dated Oct. 19, 2018, for Chinese Application No. 201480036642.5, a counterpart foreign application of the U.S. Appl. No. 13/931,279, 9 pages.

* cited by examiner

300 ⬎

```
┌─────────────────────────────────────────────────┐
│  CONTACT A FIRST OPTICALLY CLEAR ADHESIVE (OCA) WITH │
│  A SECOND OCA, THE FIRST OCA HAVING A TOTAL LUMINOUS │
│  TRANSMITTANCE OF NO GREATER THAN APPROXIMATELY 30% FOR AT │
│  LEAST A PORTION OF THE ULTRAVIOLET SPECTRUM OF RADIATION │
│                       302                        │
└─────────────────────────────────────────────────┘
                         │
                         ▼
┌─────────────────────────────────────────────────┐
│   ASSEMBLE A DISPLAY STACK INCLUDING AT LEAST    │
│   A FIRST SUBSTRATE AND A SECOND SUBSTRATE       │
│                       304                        │
│  ┌───────────────────────────────────────────┐  │
│  │    COUPLE THE FIRST SUBSTRATE TO THE      │  │
│  │    SECOND SUBSTRATE WITH THE FIRST        │  │
│  │       OCA AND THE SECOND OCA              │  │
│  │                  306                       │  │
│  └───────────────────────────────────────────┘  │
└─────────────────────────────────────────────────┘
```

FIG. 3

REDUCING DISCOLORATION OF A DISPLAY STACK

BACKGROUND

Electronic displays (also referred to herein as "displays") are found in numerous types of electronic devices such as electronic book ("eBook") readers, mobile telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the electronic device that includes the electronic display. The appearance and quality of images produced on a display can affect the user's experience with the electronic device and the content presented thereon. In some cases, the processes used to assemble an electronic display and/or the materials included in the electronic display may affect the appearance and quality of content produced on the electronic display.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates a flow diagram of an example process to assemble a display stack including substrates coupled using a first optically clear adhesive that includes an additive to filter UV radiation and a second optically clear adhesive.

DETAILED DESCRIPTION

Figure 1:
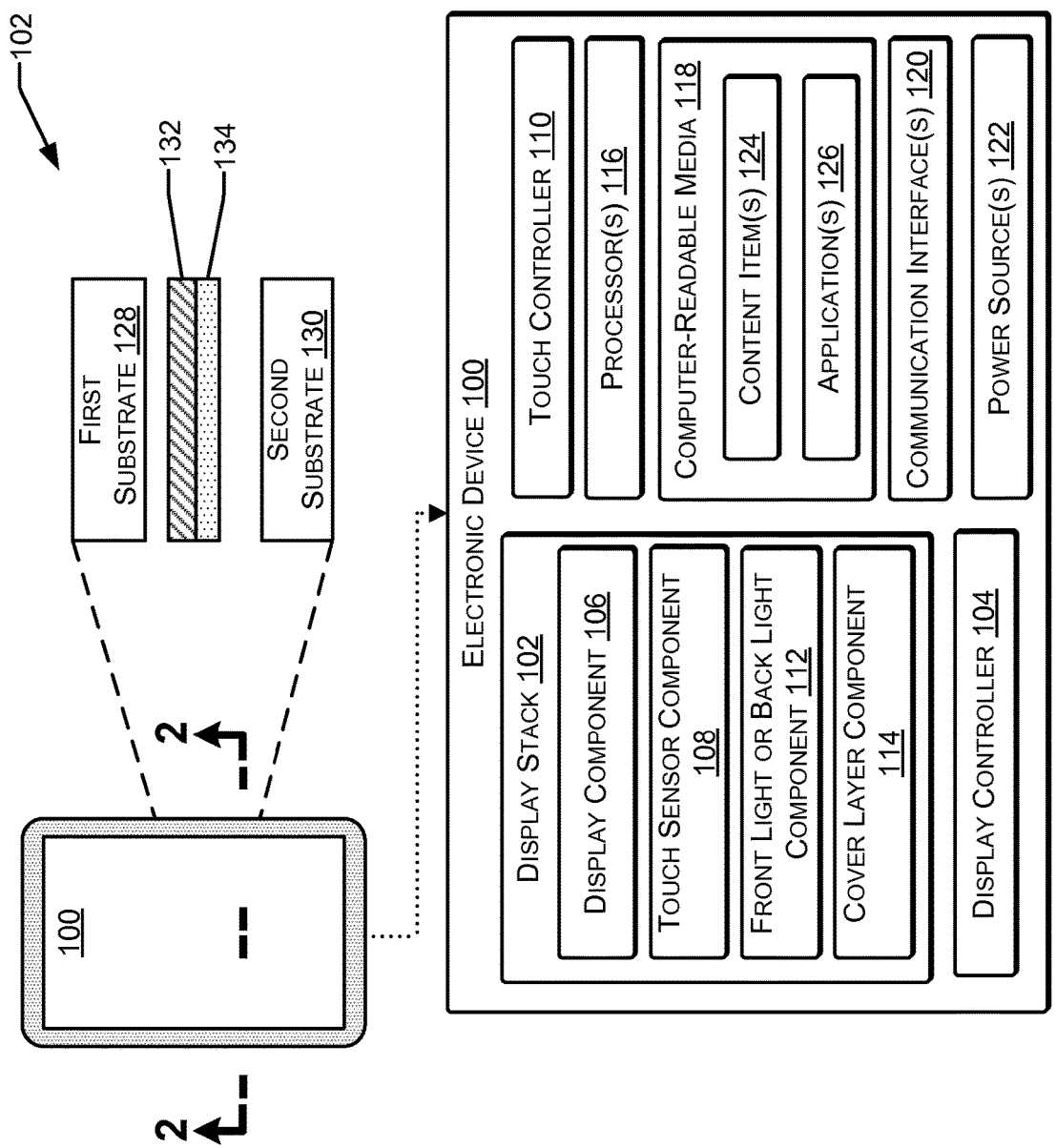
FIG. 1 illustrates an example electronic device that includes a display stack having substrates coupled using a first optically clear adhesive that includes an additive to filter ultraviolet radiation and a second optically clear adhesive.

This disclosure describes, in part, electronic devices that include electronic displays that present content and other information. The electronic displays can include a display stack that has a number of layers, including a number of substrates and one or more adhesive layers to bond the substrates. For example, a display stack can include a display component that displays content. Additionally, a number of additional substrates can be stacked on top of the display component. To illustrate, a display stack can include a touch sensor that generates signals in response to an input device contacting the display stack. In some cases, a substrate of the display stack can include a cover layer located at the top of the display stack to protect other substrates of the display stack. The cover layer can include antiglare properties, antireflective properties, anti-fingerprint properties, anti-cracking properties, and the like. The display stack can also include a lighting component, such as a front-end lighting component or a backlight lighting component to provide light to view the content rendered on the display component.

At least a portion of the substrates of the display stack may be coupled together using one or more adhesives. In some cases, the physical properties and the optical properties of the one or more adhesives can affect the quality of the appearance of the content shown on the display. For example, an adhesive included in a display stack can be optically clear or substantially optically clear to provide a clear view of content displayed on a display component of the display stack. Additionally, an adhesive included in a display stack can have a refractive index that reduces any reflection of light within the display stack. In another example, a lack of adhesion strength in an adhesive layer can result in delamination between substrates. Poor adhesion between substrates can also cause bubbles to form between the substrates, which can decrease the quality of the appearance of content displayed with the display stack.

Further, the materials included in the display stack can change color when exposed to electromagnetic radiation. For example, some materials in a display stack can turn a shade of yellow or a shade of green when exposed to ultraviolet (UV) radiation. The change in color of materials in the display stack can negatively impact the quality of the appearance of content rendering using the display stack.

Accordingly, in implementations described herein, substrates included in a display stack of an electronic device can be coupled with a combination of a first optically clear adhesive (OCA) that includes an additive, such as a dye, to filter UV radiation and a second OCA. In one example, the first OCA can have a total luminous transmittance of no greater than approximately 30% for at least a portion of the ultraviolet spectrum of radiation. In some implementations, the first OCA can include an acrylic-containing OCA. Additionally, the second OCA can include a silicon-containing OCA. In a particular implementation, the first OCA and the second OCA can be contacted with each other before being used to couple a first substrate with a second substrate. In an illustrative implementation, the first OCA and the second OCA can be laminated together and then used to bond the first substrate and the second substrate. Furthermore, in some implementations, the first optically clear adhesive and the second optically clear adhesive can couple upper layers of the display stack to each other. To illustrate, the combination of the first OCA and the second OCA can be used to couple a cover glass portion of the display stack or a touch sensor portion of the display stack, to a lighting portion of the display stack.

By using suitable UV-filtering OCAs to couple substrates of a display stack, layers of the display stack that are sensitive to UV radiation can be protected, and UV radiation and discoloration of UV sensitive layers of the display stack can be minimized. In addition, by using the UV-filtering OCAs to couple substrates located at or near the top of the display stack, the number of layers of the display stack protected from UV radiation can be maximized. Further, by using a combination of a silicon-containing OCA and an acrylic-containing OCA, adhesion strength can be improved due to the acrylic-containing OCA, while the silicon-containing OCA provides the proper refractive index to illuminate a display component of the display stack.

FIG. 1 illustrates an example electronic device 100 that includes a display stack 102 having a number of substrates coupled using a first OCA that includes an additive to filter UV radiation and a second OCA. The electronic device 100 can include any type of electronic device having a display. For instance, the electronic device 100 can be a mobile electronic device, such as an electronic book reader, a tablet computing device, a laptop computer, a smart phone or other multifunction communication device, a portable digital assistant, a media player, a wearable computing device, an automotive display, combinations thereof, and the like. Alternatively, the electronic device 100 may be a non-mobile electronic device, such as a computer display, a desktop computing device, a television, a household appliance, industrial equipment, combinations thereof, and so forth. In addition, while FIG. 1 illustrates several example components of the electronic device 100, it is to be appreciated that the device 100 can also include other components, such as an operating system, system busses, input/output components, and the like. Further, in other examples, such as in the case of a television or computer monitor, the electronic device 100 can include a subset of the components shown.

Regardless of the specific implementation of the electronic device 100, the electronic device 100 includes the display stack 102 and a corresponding display controller 104. The display stack 102 can include a display component 106 that can display content via one or more image producing technologies. For example, the display component 106 can include a reflective display, such as an electronic paper display, a reflective liquid crystal display (LCD), or the like. Electronic paper displays represent an array of display technologies that can mimic the look of ordinary ink on paper. In contrast to backlit displays, electronic paper displays typically reflect light, much as ordinary paper does. In addition, electronic paper displays can be bi-stable, meaning that these displays are capable of holding text or other rendered images even when very little or no power is supplied to the display. Some examples of the display component 106 that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of electronic devices 100, the display component 106 can include an active display such as a liquid crystal display, a plasma display, a light emitting diode display, an organic light emitting diode display, and so forth. Accordingly, implementations herein are not limited to any particular display technology.

In one implementation, the display component 106 includes an electrophoretic display that moves particles between different positions to achieve different color shades. For instance, in a pixel that is free from a color filter, the pixel can be configured to produce white when the particles within this pixel are located at the front (i.e., viewing) side of the display component 106. When situated in this manner, the particles reflect incident light, thus giving the appearance of a white pixel. Conversely, when the particles are pushed near the rear of the display component 106, the display component 106 absorbs the incident light and, hence, causes the pixel to appear black to a viewing user. In addition, the particles can be situated at varying locations between the front and rear sides of the display component 106 to produce varying shades of gray. Furthermore, as used herein, a "white" pixel can include any shade of white or off white, while a "black" pixel can include any shade of black.

In another implementation, the display component 106 can include an electrophoretic display that includes oppositely charged light and dark particles. In these implementations, to create white, the display controller 104 can move light particles to the front side of the display component 106 by creating a corresponding charge at an electrode near the front of the display component 106 and moves the dark particles to the back of the display component 106 by creating a corresponding charge at an electrode near the back. In order to create black, meanwhile, the display controller 104 changes the polarities and moves the dark particles to the front of the display component 106 and the light particles to the back of the display component 106. Furthermore, to create varying shades of gray, the display controller 104 can utilize different arrays of both light and dark particles. In some cases, the particles can be contained in individual transparent capsules. In a particular example, the capsules can have a diameter included in a range of 35 micrometers to 45 micrometers. The capsules can be suspended in a fluid, such as a liquid polymer, between a transparent upper electrode grid layer and a lower electrode grid layer separated by a gap of approximately 50 micrometers to 200 micrometers.

While several different examples have been given, the reflective displays described herein can comprise any other type of electronic-paper technology or reflective-display technology. In addition, while some of the examples described above are discussed as rendering black, white, and varying shades of gray, the described techniques can also apply to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display component 106 may represent a backlit display, examples of which are mentioned above.

In addition to including the display component 106, the electronic device 100 can include a touch sensor component 108 and a touch controller 110. In some instances, at least one touch sensor component 108 resides with, or is stacked on, the display component 106 to form a touch-sensitive display (e.g., an electronic paper touch-sensitive display). Thus, the display stack 102 can be capable of both accepting user touch input and rendering content in response to or corresponding to the touch input. As several examples, the touch sensor component 108 can include a capacitive touch sensor, a force sensitive resistance (FSR) sensor, an interpolating force sensitive resistance (IFSR) sensor, or any other type of touch sensor. In some instances, the touch sensor component 108 is capable of detecting touches as well as determining an amount of pressure or force of these touches.

The electronic device 100 can also include a front light component 112 (which may alternatively be a backlight component in the case of a backlit display) for lighting the display stack 102. The front light component 112 can include a light guide portion and a light source (not shown in FIG. 1). The light guide portion can include a substrate including a transparent thermoplastic polymer. For example, the light guide portion can include an acrylic polymer. In one implementation, the light guide portion can include polymethylmethacrylate (PMMA). In a particular implementation, the light guide portion can include a substrate, a layer of lacquer and multiple grating elements formed in the layer of lacquer. The multiple grating elements can be configured to propagate light to illuminate the display component 106.

Furthermore, the amount of light emitted by the front light component 112 may vary. For instance, upon a user opening a cover (not shown in FIG. 1) of the electronic device 100, the light from the front light component 112 may gradually increase to its full illumination. In some instances, the electronic device 100 includes an ambient light sensor (not shown in FIG. 1) and the amount of illumination of the front light component 112 can be based at least in part on the amount of ambient light detected by the ambient light sensor. For example, the front light component 112 can be dimmer if the ambient light sensor detects relatively little ambient light, such as in a dark room; can be brighter if the ambient light sensor detects ambient light within a particular range; and can be dimmer or turned off if the ambient light sensor detects a relatively large amount of ambient light, such as direct sunlight.

In addition, the settings of the display component 106 can vary depending on whether the front light component 112 is on or off, or based on the amount of light provided by the front light component 112. For instance, the electronic device 100 can implement a larger default font or a greater contrast when the front light component 112 is off compared to when the front light component 112 is on. In some instances, the electronic device 100 maintains, when the front light component 112 is on, a contrast ratio for the display component 106 that is within a certain defined percentage of the contrast ratio when the front light component 112 is off.

In addition, the electronic device 100 can include a cover layer component 114. The cover layer component 114 can include a substantially transparent substrate or sheet having an outer layer that functions to reduce at least one of glare or reflection of ambient light incident on the electronic device 100. In some instances, the cover layer component 114 can include a film including a polyester, a polycarbonate, or both. In some instances, the film may be manufactured with additives such that the resulting film includes a hardness rating that is greater than a predefined threshold. In this way, the cover layer component 114 can be resistant to scratches caused by objects having a hardness rating less than the predefined threshold. In a particular example, the threshold hardness rating can include at least a hardness rating that is resistant to a 3 h pencil. Without such scratch resistance, the electronic device 100 can be more easily scratched and a user may perceive the scratches from the light that is dispersed over the top of the reflective display. The cover layer component 114 may, in some instances, include a UV filter, a UV-absorbing dye, or the like, for protecting components in the display stack 102 from UV light incident on the electronic device 100. In still other examples, the cover layer component 114 may include a sheet of high-strength glass having an antiglare and/or antireflective coating.

In an implementation, the touch sensor component 108 can be disposed atop the display component 106. In some examples, the touch sensor component 108 can be formed on or integrated with the cover layer component 114. In other examples, the touch sensor component 108 may be a separate component in display stack 102. Additionally, the front light component 112 can be disposed atop or below the touch sensor component 108. In some instances, either the touch sensor component 108 or the front light component 112 is coupled to a top surface of the display component 106. In some instances, the cover layer component 114 can couple to another component or to the display component 106.

The electronic device 100 can include one or more processors 116 and one or more computer-readable media 118, one or more communication interfaces 120 and one or more power sources 122. The communication interfaces 120 can support both wired and wireless connection to various networks, such as cellular networks, radio, WiFi networks, short range networks (e.g., Bluetooth®), infrared (IR), and so forth.

Depending on the configuration of the electronic device 100, the computer-readable media 118 (and other computer-readable media described throughout) is an example of computer storage media and can include volatile and non-volatile memory. Thus, the computer-readable media 118 can include, but is not limited to, RAM, ROM, EEPROM, flash memory, or other memory technology, or any other medium that can be used to store computer-readable instructions, programs, applications, media items, and/or data which can be accessed by the electronic device 100.

The computer-readable media 118 can be used to store any number of functional components that are executable on the processor 116, as well as content items 124 and applications 126. Thus, the computer-readable media 118 can include an operating system and a storage database to store one or more of the content items 124, such as eBooks, audio books, songs, videos, still images, and the like. The computer-readable media 118 of the electronic device 100 can also store one or more content presentation applications to render some of the content items 124 on the electronic device 100 via the display component 106. These content presentation applications may be implemented as various applications 126 depending upon the content items 124 being rendered. For instance, a content presentation application can include an electronic book reader application for rendering textual electronic books. In other cases, the applications 126 can include an audio player for playing audio books or songs, a video player for playing video, and so forth.

In an illustrative implementation, the display stack 102 can be formed by combining a number of substrates. For example, the display stack 102 can include a first substrate 128 and a second substrate 130. In some cases, the first substrate 128 can include the touch sensor component 108. In other scenarios, the first substrate 128 can include the cover layer component 114. Additionally, in some implementations, the first substrate 128 can include the cover layer component 114 with the touch sensor component 108 formed on the cover layer component 114. Although the first substrate 128 and the second substrate 130 are illustrated as being part of the display stack 102 in the illustrative example of FIG. 1, the display stack 102 can include more than two substrates, as described previously.

The first substrate 128 and the second substrate 130 can be coupled together using one or more adhesives, such as a first adhesive 132 and a second adhesive 134. In an implementation, the first adhesive 132, the second adhesive 134, or both can include an optically clear adhesive (OCA). In some implementations, an OCA can have a transmittance of radiation of a specified wavelength of at least 95%, at least 98%, at least 99%, or at least 99.5%.

In a particular implementation, the first adhesive 132 can include an acrylic-containing OCA. In some situations, the acrylic-containing OCA can include polymethylmethacrylate (PMMA). In an illustrative implementation, the first adhesive 132 can include an additive, such as a dye, to filter UV radiation. For example, an additive included in the first adhesive 132 can block an amount of UV radiation from being transmitted through the first adhesive 132 by interacting with UV radiation particles moving through the first adhesive 132. To illustrate, the first adhesive 132 can have a total luminous transmittance of no greater than approximately 30% for at least a portion of the UV spectrum of radiation. In an illustrative example, the first adhesive 132 can include EA122CC or EA122DD from New Tac Kasei Co, Ltd. of Shikokuchuo, Ehime, Japan.

The total luminous transmittance can be defined as the sum of the regular transmittance and the diffuse transmittance. The regular transmittance can be defined as the ratio of directly transmitted power, that is, power transmitted in a particular direction, to incident radiant power, while the diffuse transmittance can be defined as the ratio of diffusely transmitted power, that is, power transmitted in multiple directions to incident radiant power. The total luminous transmittance can be measured by a spectrophotometer, such as the UV-2550 from Shimadzu Corporation of Kyoto, Japan. In addition, the spectrum of UV radiation as used herein can include a range of wavelengths included in the electromagnetic spectrum that can range from about 10 nm to about 400 nm. The spectrum of UV radiation can include different types of UV radiation, such as UVA, UVB, UVC, extreme UV, vacuum UV, and so forth.

Additionally, in some cases, the second adhesive 134 can include a silicon-containing OCA. To illustrate, in some situations, the second adhesive 134 can include a silicone-containing OCA. In an illustrative example, the second adhesive 134 can include ARclear® 8932EE from Adhesives Research, Inc. of Glen Rock, Pa.

In an implementation, the first adhesive 132 and the second adhesive 134 can be coupled to each other before being used to bond the first substrate 128 to the second substrate 130. In some instances, after coupling the first adhesive 132 with the second adhesive 134, the first substrate 128 can be bonded with the second substrate 130 by contacting a surface of the first substrate 128 with the first adhesive 132, and subsequently contacting a surface of the second substrate 130 with the second adhesive 134. In other scenarios, after coupling the first adhesive 132 with the second adhesive 134, the first substrate 128 can be bonded with the second substrate 130 by contacting a surface of the second substrate 130 with the second adhesive 134, and subsequently contacting a surface of the first substrate 128 with the first adhesive 132.

By coupling substrates of the display stack 102 using an adhesive that includes an additive to filter UV radiation, discoloration of layers of the display stack 102 can be minimized. Thus, the appearance of content displayed via the display stack 102 can be improved. Additionally, when the first adhesive 132 includes an acrylic-containing OCA, the adhesion between the first substrate 128 and the second substrate 130 can be improved. Including an acrylic-containing OCA in the display stack 102 can also improve adhesion between the first adhesive 132 and the second adhesive 134. By improving adhesion between layers of the display stack 102, bubbles formed between the first substrate 128 and the second substrate 130 can be minimized and the appearance of content displayed via the display stack 102 can be improved. Furthermore, improvement in the adhesion strength between the first substrate 128 and the second substrate 130 can reduce delamination between the first substrate 128 and the second substrate 130. In addition, when the second adhesive 134 includes a silicone-containing adhesive, the optical properties of the second adhesive 134 can provide sufficient reflection of light from the front light component 112 to provide a clear view of the display component 106.

Figure 2:
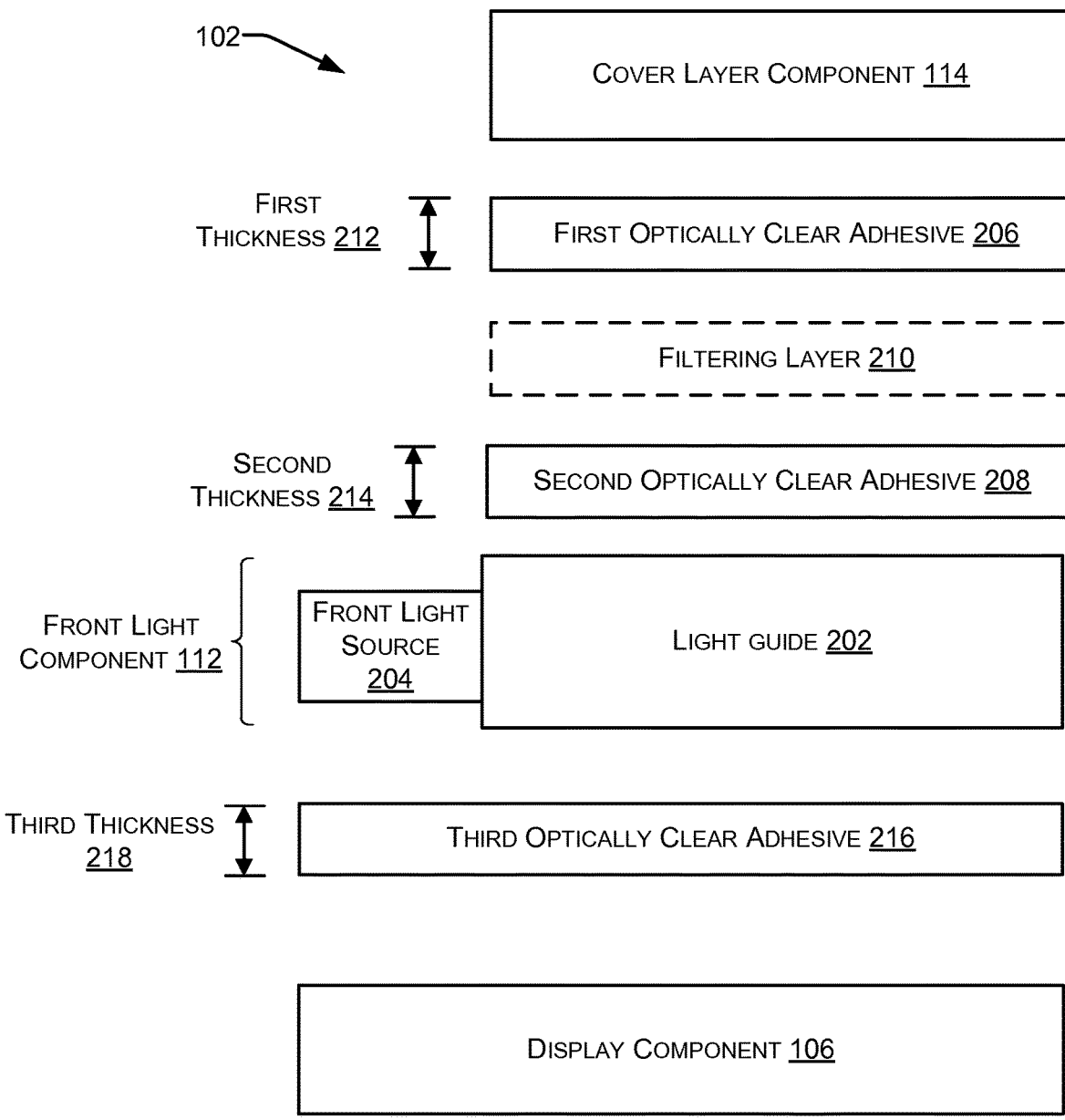
FIG. 2 illustrates an example schematic cross-section of the display stack including substrates coupled using a first optically clear adhesive that includes an additive to filter UV radiation and a second optically clear adhesive taken along line 2-2 of FIG. 1.

FIG. 2 illustrates an example schematic cross-section of the display stack 102 including substrates coupled using a first optically clear adhesive that includes an additive to filter UV radiation and a second optically clear adhesive taken along line 2-2 of FIG. 1. In the illustrative example of FIG. 2, the display stack 102 includes the display component 106 to display content. In an implementation, the display component 106 can be formed by coating e-ink onto a film, such as via a roll-to-roll process.

The display stack 102 can also include the front light component 112 that includes a light guide 202 and a front light source 204. The light guide 202 can include material that includes etchings, gratings or other patterns formed thereon for directing light from the front light source 204 to illuminate the display component 106. In a particular implementation, the light guide 202 includes an acrylic-containing material. For example, the light guide 202 can include PMMA. In some implementations, the front light source 204 can include one or more light emitting diodes or other suitable sources of illumination positioned on one or more edges of the light guide 202.

Additionally, the display stack 102 includes the cover layer component 114. The cover layer component 114 can have one or more layers that include antiglare properties, antireflective properties, anti-smudge properties, crack-resistant properties, scratch-resistant properties, a specified hardness, or combinations thereof. Furthermore, the display stack 102 can include one or more additional components, such as a touch sensor portion to detect user input via an input device (e.g., a finger, a stylus, etc.). In some implementations, the touch sensor portion can be coupled to the cover layer component 114. In other implementations, the touch sensor portion can be coupled to the display component 106. In a particular implementation, the touch sensor portion can include one or more layers of electrodes formed on the cover layer component 114 or the display component 106.

The display stack 102 can also include a first optically clear adhesive (OCA) 206 and a second OCA 208. The first OCA 206 and the second OCA 208 can bond a number of substrates of the display stack 102 together. For example, the first OCA 206 and the second OCA 208 can bond at least the cover layer component 114 to the front light component 112. In another example, the first OCA 206 and the second OCA 208 can bond a touch sensor portion formed on the cover layer component 114 to the front light component 112.

In some implementations, the first OCA 206 can include an acrylic-containing OCA. In particular, the first OCA 206 can include an acrylate. In another implementation, the first OCA 206 can include a silicone-containing OCA. In some scenarios, the first OCA 206 can have an adhesion strength included in a range of 10 N/25 mm to 20 N/25 mm when measured with respect to a glass substrate when following the JIS Z0237 testing standard. In other scenarios, the first OCA 206 can have an adhesion strength included in a range of 12 N/25 mm to 16 N/25 mm when measured with respect to a glass substrate when following the JIS Z0237 testing standard.

In an implementation, the second OCA 208 can include a silicon-containing OCA. To illustrate, the second OCA 208 can include silicone. In some instances, the second OCA 208 can have a 180° peel adhesion from stainless steel of 60 oz./in. when measured according to the ASTM D-3330 testing standard.

In a particular implementation, the first OCA 206 can include an additive to filter UV radiation. In one example, the first OCA 206 can have a total luminous transmittance of no greater than approximately 60%, no greater than approximately 50%, no greater than approximately 40%, no greater than approximately 30%, no greater than approximately 20%, or no greater than approximately 10% for at least a portion of the spectrum of UV radiation. In an illustrative implementation, the first OCA 206 can have a total luminous transmittance of no greater than approximately 60% for wavelengths of the electromagnetic spectrum included in a range of 10 nm to 400 nm. In an additional illustrative implementation, the first OCA 206 can have a total luminous transmittance of no greater than approximately 45% for wavelengths of the electromagnetic spectrum included in a range of 10 nm to 400 nm. In another illustrative implementation, the first OCA 206 can have a total luminous transmittance of no greater than approximately 30% for wavelengths of the electromagnetic spectrum included in a range of 100 nm to 400 nm. In a further illustrative implementation, the first OCA 206 can have a total luminous transmittance of no greater than approximately 30% for wavelengths of the electromagnetic spectrum included in a range of 320 nm to 400 nm. In yet another illustrative implementation, the first OCA 206 can have a total luminous transmittance of no greater than approximately 30% for wavelengths of the electromagnetic spectrum included in a range of 200 nm to 380 nm. In still another illustrative implementation, the first OCA 206 can have a total luminous transmittance of no greater than approximately 30% for wavelengths of the electromagnetic spectrum included in a range of 200 nm to 360 nm.

In another example, the first OCA 206 can have a total luminous transmittance of no greater than 15% for at least a portion of the spectrum of ultraviolet radiation. To illustrate, the first OCA 206 can have a total luminous transmittance of no greater than approximately 15% for wavelengths of the electromagnetic spectrum included in a range of 10 nm to 400 nm. In another illustrative implementation, the first OCA 206 can have a total luminous transmittance of no greater than approximately 15% for wavelengths of the electromagnetic spectrum included in a range of 100 nm to 400 nm. In a further illustrative implementation, the first OCA 206 can have a total luminous transmittance of no greater than approximately 15% for wavelengths of the electromagnetic spectrum included in a range of 300 nm to 400 nm. In still another illustrative implementation, the first OCA 206 can have a total luminous transmittance of no greater than approximately 15% for wavelengths of the electromagnetic spectrum included in a range of 300 nm to 380 nm.

In yet another example, the first OCA 206 can have a total luminous transmittance of no greater than approximately 5% for at least a portion of the spectrum of ultraviolet radiation. To illustrate, the first OCA 206 can have a total luminous transmittance of no greater than approximately 5% for wavelengths of the electromagnetic spectrum included in a range of 10 nm to 400 nm. In another illustrative implementation, the first OCA 206 can have a total luminous transmittance of no greater than approximately 5% for wavelengths of the electromagnetic spectrum included in a range of 300 nm to 400 nm. In a further illustrative implementation, the first OCA 206 can have a total luminous transmittance of no greater than approximately 5% for wavelengths of the electromagnetic spectrum included in a range of 350 nm to 400 nm. In still another illustrative implementation, the first OCA 206 can have a total luminous transmittance of no greater than approximately 5% for wavelengths of the electromagnetic spectrum included in a range of 300 nm to 380 nm. In other illustrative implementations, the first OCA 206 can have a total luminous transmittance of no greater than approximately 5% for wavelengths of the electromagnetic spectrum included in a range of 200 nm to 300 nm.

In other implementations, the display stack 102 can include a filtering layer 210. In some cases, the filtering layer 210 can have a thickness included in a range of 10 micrometers to 40 micrometers. In other situations, the filtering layer 210 can have a thickness less than 10 micrometers. In a particular illustrative implementation, the filtering layer 210 can include a film from OIKE & Co., Ltd. of Kyoto, Japan.

In an illustrative implementation, the filtering layer 210 can have a total luminous transmittance of no greater than approximately 30% for at least a portion of the spectrum of ultraviolet radiation. To illustrate, the filtering layer 210 can have a total luminous transmittance of no greater than approximately 30% for wavelengths of the electromagnetic spectrum included in a range of 200 nm to 380 nm. In another illustrative implementation, the filtering layer 210 can have a total luminous transmittance of no greater than approximately 30% for wavelengths of the electromagnetic spectrum included in a range of 300 nm to 360 nm. In yet another illustrative implementation, the UV filtering layer 210 can have a total luminous transmittance no greater than approximately 10% for at least a portion of the spectrum of ultraviolet radiation. To illustrate, the filtering layer 210 can have a total luminous transmittance of no greater than approximately 10% for wavelengths of the electromagnetic spectrum included in a range of 200 nm to 380 nm. In another illustrative implementation, the filtering layer 210 can have a total luminous transmittance of no greater than approximately 10% for wavelengths of the electromagnetic spectrum included in a range of 200 nm to 300 nm.

In some cases, the filtering layer 210 can be used in the display stack 102 when the first OCA 206 does not include a UV filtering additive. Although, the illustrative example of FIG. 2 illustrates the filtering layer 210 between the first OCA 206 and the second OCA 208, in some implementations, the UV filtering layer 210 can be disposed in other locations of the display stack 102. For example, in one implementation, the filtering layer 210 can be a disposed on a surface of the light guide 202.

In some instances, the first OCA 206 and the second OCA 208 can have a refractive index included in a range of 1.35 to 1.58. In one example, the first OCA 206 can have a refractive index of at least 1.45, at least 1.47, or at least 1.49. Additionally, the first OCA 206 can have a refractive index no greater than 1.56, no greater than 1.54, or no greater than 1.52. In an illustrative implementation, the first OCA 206 can have a refractive index included in a range of 1.48 to 1.53. Further, the second OCA 208 can have a refractive index of at least 1.33, at least 1.36, or at least 1.39. In other situations, the second OCA 208 can have a refractive index no greater than 1.47, no greater than 1.44, or no greater than 1.41. In an illustrative implementation, the second OCA 208 can have a refractive index included in a range of 1.38 to 1.43.

The first OCA 206 can have a first thickness 212 and the second OCA 208 can have a second thickness 214. In a particular implementation, the first thickness 212, the second thickness 214, or both can be at least 10 micrometers, at least 25 micrometers, or at least 40 micrometers. In another implementation, the first thickness 212, the second thickness 214, or both can be no greater than 100 micrometers, no greater than 80 micrometers, or no greater than 60 micrometers. In an illustrative implementation, the first thickness 212, the second thickness 214, or both can be included in a range of 8 micrometers to 110 micrometers. In an additional illustrative implementation, the first thickness 212, the second thickness 214, or both can be included in a range of 20 micrometers to 55 micrometers. In other illustrative implementations, the first thickness 212 can be included in a range of 15 micrometers to 75 micrometers and the second thickness 214 can be included in a range of 10 micrometers to 100 micrometers.

The display stack 102 can also include a third OCA 216 to couple the front light component 112 to the display component 106. In an implementation, the third OCA 216 can include a liquid optically clear adhesive (LOCA). In a particular implementation, the third OCA 216 can include a silicon-containing LOCA, such as a silicone-containing LOCA. In other implementations, the third OCA 216 can include a fluorine-containing LOCA. In a particular implementation, the third OCA 216 can have a refractive index included in a range of 1.35 to 1.45.

In some implementations, the third OCA 216 can have a shore OO hardness of at least 50, at least 55, or at least 60. In other implementations, the third OCA 216 can have a shore OO hardness of no greater than 80, no greater than 75, or no greater than 70. In an illustrative implementation, the third OCA 216 can have a shore OO hardness included in a range of 58 to 82. In another illustrative implementation, the third OCA 216 can have a shore OO hardness included in a range of 66 to 74.

In addition, the third OCA 216 can have a percent elongation at failure of at least 110%, at least 130%, or at least 150%. In other implementations, the third OCA 216 can have a percent elongation at failure of no greater than 200%, no greater than 180%, or no greater than 160%. In an illustrative implementation, the third OCA 216 can have a percent elongation at failure included in a range of 100% to 220%. In another illustrative implementation, the third OCA 216 can have a percent elongation at failure included in a range of 125% to 160%.

The third OCA 216 can have a third thickness 218. In a particular implementation, the third thickness 218 can be at least 100 micrometers, at least 130 micrometers, or at least 160 micrometers. In another implementation, the third thickness 218 can be no greater than 230 micrometers, no greater than 210 micrometers, or no greater than 190 micrometers. In an illustrative implementation, the third thickness 218 can be included in a range of 80 micrometers to 250 micrometers. In an additional illustrative implementation, the third thickness 218 can be included in a range of 145 micrometers to 185 micrometers.

In some implementations, the display stack 102 can include one or more additional layers not illustrated in FIG. 2. For example, the display stack 102 can include a front plane laminate layer and a thin film transistor layer as part of the display component 106. Additionally, the display stack 102 can include one or more protective layers placed between one or more layers of the display stack 102. In some cases, the display stack 102 can also include a flexible printed circuit layer coupled to an electronic paper display of the display component 106. In other implementations, the display stack 102 can include fewer layers than those illustrated in FIG. 2. To illustrate, in some cases, the filtering layer 210 can be optional. Furthermore, in some scenarios, a single OCA can be disposed between the cover layer component 114 and the light guide 202, such as a silicone-containing OCA or an acrylic-containing OCA having an additive that filters UV radiation, according to implementations previously described.

FIG. 3 illustrates a flow diagram of an example process 300 to assemble a display stack including substrates coupled using a first optically clear adhesive (OCA) that includes an additive to filter UV radiation and a second OCA. In some implementations, the display stack can include the display stack 102 of FIG. 1 and FIG. 2 and the first OCA can include the first adhesive 132 of FIG. 1, the first OCA 206 of FIG. 2, or both, and the second OCA can include the second adhesive 134 of FIG. 1, the second OCA 208 of FIG. 2, or both. The order in which the operations are described is not intended to be construed as a limitation, and any number of the described operations can be combined in any order and/or in parallel to implement the process. For example, in one implementation, the display stack can be assembled using a top-down process, while in another implementation, the display stack can be assembled using a bottom-up process.

At 302, the process 300 includes contacting the first OCA with the second OCA. In an implementation, the first OCA can have a total luminous transmittance of no greater than approximately 30% for at least a portion of the UV spectrum of radiation. In some cases, the first OCA and the second OCA can be contacted using a lamination process, such as a roll-to-roll lamination process. Additionally, the first OCA, the second OCA, or both can include a film. In a particular implementation, the first OCA, the second OCA, or both can be cut before being contacted with each other. In illustrative implementations, the first OCA, the second OCA, or both can be cut using a mechanical punch process. In some scenarios, the first OCA, the second OCA, or both can be cut to have dimensions that correspond to dimensions of substrates of the display stack. To illustrate, the dimensions of the first OCA, the second OCA, or both can correspond to the dimensions of a display component of a display stack. In an implementation, the first OCA can be contacted with the second OCA at a temperature of at least 10° C., at least 20° C., or at least 30° C. In an illustrative implementation, the first OCA can be contacted with the second OCA at a temperature included in a range of 15° C. to 40° C.

At 304, the process 300 includes assembling a display stack including at least a first substrate and a second substrate. In particular, assembling the display stack can include, at 306, coupling the first substrate and the second substrate with the first OCA and the second OCA. For example, after contacting the first OCA and the second OCA, the first OCA and the second OCA can be used to couple the first substrate to the second substrate. In an illustrative implementation, the first substrate can include a cover layer of the display stack. In another illustrative implementation, the first substrate can include a touch sensor of the display stack. In an additional illustrative implementation, the first substrate can include a cover layer of the display stack with a touch sensor formed on the cover layer.

In an implementation, the first substrate can be coupled to the second substrate at a temperature of at least 12° C., at least 18° C., or at least 24° C. Additionally, the first substrate can be coupled to the second substrate at a temperature no greater than 50° C., no greater than 40° C., or no greater than 30° C. In an illustrative implementation, the first substrate can be coupled to the second substrate at a temperature included in a range of 20° C. to 35° C.

In some implementations, assembling the display stack at 304 can also include coupling one or more additional substrates to the second substrate. In some instances, the additional substrates can be coupled using additional adhesives. For example, the second substrate can include a front light component of the display stack and the operation 304 can include coupling a display component of the display stack to the front light component. In some instances, the display component can be coupled to the front light component using a liquid optically clear adhesive (LOCA). In an implementation, the LOCA can have a viscosity of at least 2000 cp, at least 2500 cp, or at least 3000 cp. In another implementation, the LOCA can have a viscosity of no greater than 5000 cp, no greater than 4500 cp, or no greater than 4000 cp. In an illustrative implementation, the LOCA can have a viscosity included in a range of 3500 cp to 4250 cp.

Further, in some scenarios, assembling the display stack at 304 can include additional operations, such as one or more curing operations. In particular, the first OCA, the second OCA, or both can be subjected to one or more curing operations. Additionally, a LOCA included in the display stack can also be subjected to one or more curing operations. The one or more curing operations can include a pre-curing operation, an intermediate curing operation, a final curing operation, a side curing operation, or a combination thereof.

In some implementations, the curing operations can include exposing one or more layers of the display stack, such as an LOCA layer, to UV radiation having a specified range of wavelengths. For example, a curing operation can be performed using UV radiation having wavelengths included in a range of 300 nm to 400 nm. The UV radiation applied during the curing operation can include UVA, UVB, UVC, UVV, or a combination thereof. In some cases, one or more substrates of the display stack can be subjected to a number of cycles of UV curing, such as one or more high intensity cycles, one or more low intensity cycles, or both.

In an implementation, a curing operation can be performed by applying a particular energy to one or more substrates of the display stack. In an implementation, an energy of at least 5 kJ/cm$^2$, at least 8 kJ/cm$^2$, or at least 12 kJ/cm$^2$ can be applied to one or more substrates of the display stack. Additionally, an energy of no greater than 25 kJ/cm$^2$, no greater than 18 kJ/cm$^2$, or no greater than 15 kJ/cm$^2$ can be applied to one or more substrates of the display stack. In an illustrative implementation, an energy applied to one or more substrates of the display stack can be included in a range of 10 kJ/cm$^2$ to 22 kJ/cm$^2$.

In some implementations, a curing operation can have a duration of at least 15 seconds, at least 45 seconds, at least 90 seconds, at least 5 minutes, at least 15 minutes, or at least 30 minutes. In other implementations, a curing operation can have a duration of no greater than 3 hours, no greater than 2 hours, or no greater than 1 hour. In an illustrative implementation, a curing operation can have a duration included in a range of 10 seconds to 2 minutes. In another illustrative implementation, a curing operation can have a duration included in a range of 5 minutes to 20 minutes. In a further illustrative implementation, a curing operation can have a duration included in a range of 45 minutes to 2.5 hours.

In some situations, the process 300 can include one or more further operations. For example, the process 300 can include one or more cleaning operations for the layers of the display stack. Additionally, the process 300 can include one or more operations that subject a layer of the display stack to a type of treatment to improve adhesion or provide protection to the layer. In a particular example, the process 300 can include a plasma treatment operation of a cover glass component to improve adhesion with an OCA. Further, some operations of the process 300 can be performed using a suitable machine. In other cases, an operation of the process 300 can be performed by hand. Also, in an alternative implementation, the process 300 can include disposing a UV filtering layer between the first adhesive and the second adhesive before coupling the first substrate to the second substrate using the first adhesive and the second adhesive.

In an illustrative example, a number of layers of the display stack can be coupled to the second substrate before coupling the first substrate to the second substrate with the first OCA and the second OCA. In one example, the first substrate can include a cover layer of the display stack and the second substrate can include a light guide of a display stack. In this example, the light guide can be coupled to a display component of the display stack using a liquid optically clear adhesive before the cover layer is coupled to the light guide. In some cases, a flexible printed circuit can be coupled with the light guide before coupling the light guide to the display component. Thus, the flexible printed circuit can be disposed between the light guide and the display component.

After coupling the light guide to the display component with the LOCA, one or more curing operations can be performed to cure the LOCA. In an implementation, a main curing operation can be performed with respect to the LOCA by applying UV radiation to a top surface and/or a bottom surface of the combination of the light guide and the display component. In some cases, the main curing operation can be performed with a total energy included in a range of 15 kJ/cm$^2$ to 20 kJ to cm$^2$. In a particular implementation, the main curing operation can include at least one high intensity cycle, at least one low intensity cycle, or both. The combination of the display component and the light guide can also undergo a side curing operation for the LOCA. The side curing operation can be performed by applying UV radiation having an energy included in a range of 15 kJ/cm$^2$ to 20 kJ/cm$^2$.

After curing the LOCA, a combination of the first OCA, the second OCA, and the cover glass can be laminated to the combination of the display component, LOCA, and light guide. In an implementation, the lamination process can take place in a chamber at suitable pressures. In one illustrative implementation, the chamber can include a vacuum chamber and the pressure in the vacuum chamber can be included in a range of 30 Pa to 150 Pa. In another illustrative implementation, the pressure in the vacuum chamber can be included in a range of 80 Pa to 110 Pa.

After laminating the cover glass/first OCA/second OCA combination with the light guide/LOCA/display component, the display stack can undergo one or more additional processes. For example, the display stack can undergo a module edge press at a pressure included in a range of 0.1 MPa to 0.3 MPa for a duration included in a range of 5 seconds to 20 seconds and at a temperature included in a range of 50° C. to 70° C. Additionally, the display stack can be placed in a heating chamber, such as an autoclave, at a temperature included in a range of 40° C. to 60° C. for a duration included in a range of 700 seconds to 1100 seconds. Further, an external force included in a range of 4 kgf to 7 kgf can be applied to the display stack while the display stack is in the autoclave.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
a display stack including:
   a front light component including a light guide, the front light component having a first surface and a second surface substantially parallel to the first surface;
   a touch sensor;
   a first adhesive disposed between the front light component and the touch sensor, the first adhesive including an acrylic-based adhesive, and the first adhesive including a dye such that the first adhesive has first total luminous transmittance values for wavelengths of radiation included in a range of about 10 nanometers (nm) to about 300 nm and second total luminous transmittance values for wavelengths of radiation included in a range of about 300 nm to about 380 nm, the second total luminous transmittance values being different from the first total luminous transmittance values;
   a second adhesive, wherein:
      the second adhesive includes a silicon-based adhesive;
      the second adhesive has a first surface coupled to the first surface of the front light component and a second surface coupled to and in contact with the first adhesive; and
      the first surface of the second adhesive is substantially parallel to the second surface of the second adhesive;
   a display component; and
   a third adhesive coupled between the front light component and the display component, wherein the third adhesive includes a liquid optically clear adhesive (LOCA) and has a thickness included in a range of 145 micrometers to 185 micrometers.

2. The electronic device of claim 1, wherein the display component includes an electronic paper display.

3. The electronic device of claim 1, wherein the first adhesive has a total luminous transmittance of at least 98% for at least a portion of wavelengths of radiation included in a range of about 390 nm to about 700 nm.

4. The electronic device of claim 1, wherein the first adhesive is coupled to a first surface of the touch sensor, and the display stack further comprises a cover layer coupled to a second surface of the touch sensor, the second surface of the touch sensor being substantially parallel to the first surface of the touch sensor.

5. A display stack comprising:
a display component;
a light component including a light source and a light guide;
a touch sensor;
a first adhesive coupled to the light guide and disposed between the light guide and the touch sensor, wherein the first adhesive has a first range of total luminous transmittance values for wavelengths of radiation included in a range of about 200 nanometers (nm) to about 300 nm and a second range of total luminous transmittance values for wavelengths of radiation included in a range of about 300 nm to about 380 nm, the second range of total luminous transmittance values being different than the first range of total luminous transmittance values, and the first adhesive is an acrylic-based adhesive;
a second adhesive coupled to the touch sensor and the first adhesive such that a surface of the first adhesive contacts a surface of the second adhesive; and
a third adhesive disposed between the light guide and the display component, the third adhesive having a thickness included in a range of about 145 micrometers to about 185 micrometers.

6. The display stack of claim 5, wherein the first adhesive is a first optically clear adhesive (OCA) and the second adhesive is a second OCA.

7. The display stack of claim 6, wherein the second OCA is a silicon-based OCA.

8. The display stack of claim 6, wherein the first adhesive has a refractive index included in a range of 1.48 to 1.53 and the second adhesive has a refractive index included in a range of 1.38 to 1.43.

9. The display stack of claim 5, wherein the first adhesive includes an additive to filter UV radiation.

10. The display stack of claim 5, wherein the display stack further comprises a cover glass coupled to the touch sensor.

11. An electronic device comprising:
a display stack including:
   a front light component including a front light source and a light guide, the light guide having a first surface and a second surface substantially parallel to the first surface;
   a touch sensor;
   a first optically clear adhesive (OCA) disposed between the light guide and the touch sensor, the first OCA including an acrylic-based OCA and the first OCA having a range of total luminous transmittance values for wavelengths of radiation included in a range of about 200 nanometers (nm) to about 300 nm of no greater than 30%;
   a second OCA disposed between the light guide and the touch sensor and coupled to the first OCA such that a surface of the first OCA contacts a surface of the second OCA, the second OCA including a silicon-based OCA, being coupled to the first OCA, and having a transmittance of at least 98% for at least a portion of wavelengths of radiation included in a range of about 390 nm to about 700 nm;
   a display component; and
   a third OCA that includes a liquid OCA (LOCA) and couples at least a portion of the light guide to at least a portion of the display component such that a first surface of the third OCA contacts the light guide and a second surface of the third OCA that is substantially parallel to the first surface of the third OCA contacts the display component, wherein the third OCA has a thickness included in a range of 145 micrometers to 185 micrometers.

12. The electronic device of claim 11, wherein the range of total luminous transmittance values of the first OCA includes values no greater than approximately 15%.

13. The electronic device of claim 11, wherein the first OCA has a first thickness included in a range of 10 micrometers to 100 micrometers and the second OCA has a second thickness included in a range of 10 micrometers to 100 micrometers.

14. The electronic device of claim 11, wherein the first OCA includes a dye that blocks at least a portion of wavelengths of radiation included in the range of about 100 nm to about 380 nm.

15. The electronic device of claim 11, wherein the first OCA and the second OCA bond at least a portion of the touch sensor to at least a portion of the light guide.

16. The electronic device of claim 11, wherein the first OCA has a first adhesion strength included in a range of 10 N/25 mm to 20 N/25 mm and the first adhesion strength is measured according to the JIS Z0237 testing standard.

17. The electronic device of claim 11, wherein the third OCA has a refractive index included in a range of 1.35 to 1.45.

18. The electronic device of claim 11, wherein the third OCA includes a silicon LOCA or a fluorine LOCA.

19. The display stack of claim 5, wherein the third adhesive has a refractive index included in a range of about 1.35 to about 1.45.

20. The display stack of claim 5, wherein third adhesive comprises at least one of:
   a silicon liquid optically clear adhesive (LOCA); or
   a fluorine LOCA.

* * * * *